US007669676B2

(12) United States Patent  (10) Patent No.: US 7,669,676 B2
Miller  (45) Date of Patent: Mar. 2, 2010

(54) HYBRID PROPULSION SYSTEM AND METHOD FOR ITS OPERATION

(75) Inventor: Larry D. Miller, Rochester, MI (US)

(73) Assignee: Larry D. Miller Trust, Rochester Hills, IL (US)

( * ) Notice: Subject to any disclaimer, the term of this patent is extended or adjusted under 35 U.S.C. 154(b) by 391 days.

(21) Appl. No.: 11/733,286

(22) Filed: Apr. 10, 2007

(65) Prior Publication Data

US 2008/0093136 A1 Apr. 24, 2008

Related U.S. Application Data

(60) Provisional application No. 60/862,655, filed on Oct. 24, 2006.

(51) Int. Cl.
 *B60W 10/04* (2006.01)
(52) U.S. Cl. .............. 180/65.265; 180/65.285; 180/65.29; 903/930; 701/22
(58) Field of Classification Search ............ 180/65.265, 180/65.275, 65.28, 65.285, 65.29, 65.31; 903/903, 930; 701/22
 See application file for complete search history.

(56) References Cited

U.S. PATENT DOCUMENTS

| 4,335,429 | A |   | 6/1982  | Kawakatsu et al. |
| 5,251,588 | A |   | 10/1993 | Tsujii et al. |
| 5,492,190 | A |   | 2/1996  | Yoshida et al. |
| 5,815,824 | A | * | 9/1998  | Saga et al. ............ 701/22 |
| 5,832,396 | A |   | 11/1998 | Moroto et al. |
| 5,892,346 | A | * | 4/1999  | Moroto et al. ............ 318/587 |
| 5,984,033 | A |   | 11/1999 | Tamagawa et al. |
| 5,995,895 | A |   | 11/1999 | Watt et al. |
| 5,999,864 | A |   | 12/1999 | Thiel et al. |
| 6,124,690 | A |   | 9/2000  | Yano et al. |
| 6,249,723 | B1 |  | 6/2001  | Lutz et al. |
| 6,318,487 | B2 |  | 11/2001 | Yanase et al. |
| 6,370,451 | B2 | * | 4/2002 | Lutz ............................ 701/22 |
| 6,381,522 | B1 | * | 4/2002 | Watanabe et al. ............ 701/22 |
| 6,470,983 | B1 |  | 10/2002 | Amano et al. |
| 6,487,477 | B1 |  | 11/2002 | Woestman et al. |
| 6,507,127 | B1 |  | 1/2003  | Amano et al. |

(Continued)

*Primary Examiner*—S. Joseph Morano
*Assistant Examiner*—John D Walters
(74) *Attorney, Agent, or Firm*—Gifford, Krass, Sprinkle, Anderson & Citkowski, P.C.

(57) ABSTRACT

A hybrid motor vehicle is operated in a front-loaded electrical power mode. The motor vehicle includes a first, electrical based, propulsion system which is powered by electrical energy stored in a rechargeable battery, and a second, fuel-based propulsion system, which is powered by oxidation of a fuel. According to the method, the amount of electrical energy stored in the battery is measured, and a percentage of that measured level is selected. A distance D which the first propulsion system, operating singly, and using that stored energy, can propel the vehicle is determined. A hybrid cruising range, which is greater than the distance D is selected, and a controller controls the operation of the first and second propulsion systems, in accord with a profile, so as to power the vehicle such that when the vehicle has traveled through the hybrid cruising range, the selected percentage of electrical energy is depleted, and when the vehicle has traveled through the first 50% of the hybrid cruising range, over 50% of the selected percentage of electrical energy stored in the battery is depleted. Also disclosed is a controller for implementing the method.

15 Claims, 2 Drawing Sheets

U.S. PATENT DOCUMENTS

Figure 1:
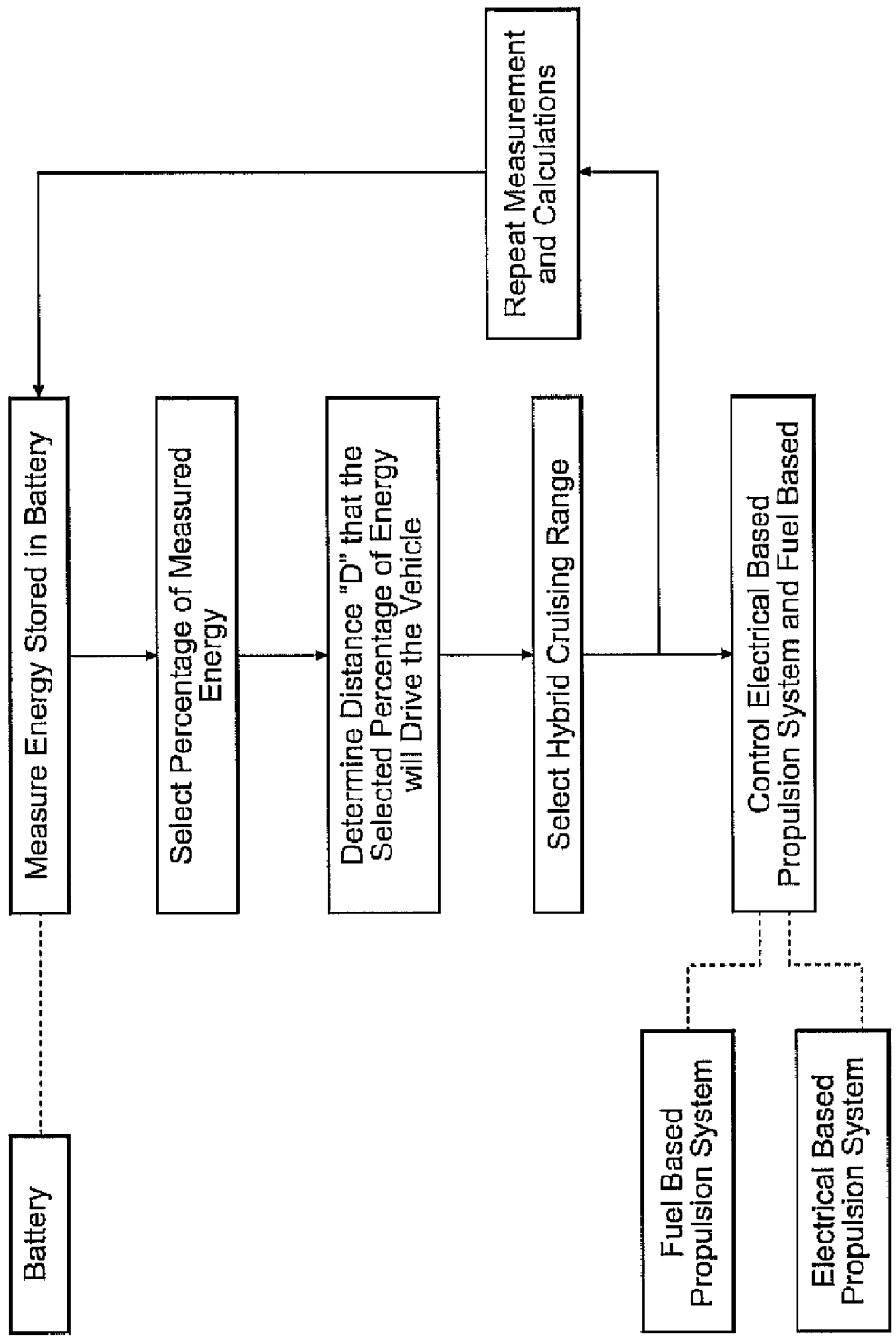

| | | |
|---|---|---|
| 6,659,213 B2 | 12/2003 | Kubo et al. |
| 6,687,607 B2 * | 2/2004 | Graf et al. .................... 701/202 |
| 6,752,226 B2 | 6/2004 | Naito et al. |
| 6,766,874 B2 | 7/2004 | Naito et al. |
| 6,856,866 B2 | 2/2005 | Nakao et al. |
| 7,073,615 B2 | 7/2006 | Mack |
| 7,134,516 B2 | 11/2006 | Eisenhardt et al. |
| 2005/0228553 A1 * | 10/2005 | Tryon .......................... 701/22 |
| 2006/0240940 A1 | 10/2006 | Saito |
| 2006/0266567 A1 | 11/2006 | Tamai et al. |
| 2007/0294026 A1 * | 12/2007 | Schirmer .................... 701/202 |

\* cited by examiner

HYBRID PROPULSION SYSTEM AND METHOD FOR ITS OPERATION

CROSS-REFERENCE TO RELATED APPLICATIONS

This patent application claims priority of Provisional Patent Application Ser. No. 60/862,655 filed Oct. 24, 2006 entitled "Hybrid Propulsion System and Method for Its Operation."

FIELD OF THE INVENTION

This invention relates generally to motor vehicles having a hybrid propulsion system in which a combination of electrical energy and energy derived by the oxidation of a fuel are used to power the motor vehicle. More specifically, the invention relates to a method for controlling and operating such a hybrid propulsion system in a "front loaded" mode where the operational efficiency of the system is maximized, and wherein the system has the option of operating in a high power mode.

BACKGROUND OF THE INVENTION

Hybrid propulsion systems are coming into common use in motor vehicles. Simple versions of such systems utilize a fuel-based system such as a fuel cell or an internal combustion engine in combination with a storage battery to power the vehicle. In one version of such systems, an internal combustion engine powers the vehicle through a mechanical transmission linkage, and also operates to recharge the battery. The battery, in turn, powers the vehicle through an electric motor, and when the vehicle is in a regenerative braking mode, this motor can operate as a generator to slow the vehicle and recharge the battery. In another version of this system, the internal combustion engine operates in conjunction with a generator to power an electrical motor which drives the vehicle; as in the previously mentioned system, the motor can also charge a battery which also powers the vehicle, and regenerative braking may be incorporated. In either system, the battery itself is capable of propelling the vehicle only for relatively short distances, in the absence of any contribution of power from the fuel-based system.

Plug-in hybrid systems are now coming into use. These systems include a relatively large storage battery which can be connected to an electrical grid when the vehicle is not being driven so as to accumulate charge. The amount of charge stored in the batteries of plug-in systems is relatively large, and typically is capable of propelling the vehicle for distances of over 12 and, in some cases, over 50 miles. Plug-in systems of this type can operate in several modes. In the simple mode, the system first powers the vehicle on solely electrical power until the battery charge is depleted, after which the vehicle is powered solely by a fuel-based system such as an internal combustion engine. In other instances, the plug-in system may operate as a conventional hybrid after the stored power is depleted. In yet other instances, the internal combustion engine may participate, in some degree, in powering the vehicle during the time it is primarily operating on battery power. For example, the engine may be used to provide auxiliary power for passing or hill climbing.

Hybrid vehicle systems of the type described above, which allow for simultaneous vehicle operation under stored battery power and power derived from the oxidation of fuel, include control systems which operate to control both the battery-powered propulsion system and the fuel-based propulsion system, so as to achieve an optimum balance of power and economy. In systems having a relatively small battery for storing electrical power, vehicles primarily are propelled by the fuel-based propulsion system and battery power is utilized to boost the power of the system as needed. In systems having a somewhat larger battery capacity, the controller may operate to allow the vehicle to be driven on solely battery power for longer periods of time, utilizing the fuel-based propulsion system, as necessary, either to achieve extra power, or in those instances when the battery power is becoming depleted. In systems having relatively large storage batteries, such as the plug-in systems described above, the controller may operate to primarily power the vehicle from stored electrical energy, utilizing the fuel-based system as needed for extra power boosts. Once the stored power is depleted to some preselected level, typically 60-80% of battery capacity, the controller may then switch to powering the vehicle primarily from the fuel-based propulsion system.

It should be noted that while this disclosure primarily describes fuel-based propulsion systems as being internal combustion engines, other fuel-based systems, including fuel cells, as well as external combustion engines, may also be used to power the vehicle. Hence, within the context of this disclosure, the hybrid motor vehicle systems are described as including a first propulsion system which is powered by electrical energy stored in a rechargeable battery, and a second propulsion system which is powered by the oxidation of the fuel. This second system can include internal combustion engines, including internal combustion engines which deliver mechanical power to drive the vehicle, and those which power a generator to produce electrical energy, as well as fuel cells which operate to generate an electrical current. Other such combustion-based systems, including turbines, vapor engines and the like, are understood to be included within the definition of combustion-based propulsion systems.

All such hybrid power systems include controllers which operate to achieve a desirable balance of power and economy; and these controllers utilize a program to achieve a desirable blend of electrical and fuel-based propulsion. It has been found that in most instances the operation of a typical non-commercial motor vehicle involves relative small amounts of driving, usually aggregating to less than 50 miles per day, and this mileage is often based upon a number of relatively short trips. However, these same drivers do, on occasion, have need to travel larger distances, hence vehicles must have sufficient range to accommodate longer journeys, which are often unanticipated. In typical hybrid vehicles of the prior art, controllers are operative to achieve a preset balance of power and economy, without talking into account the fact that most trips are relatively short, and daily driving is typically fairly low. As will be described in detail hereinbelow, the present invention factors these driving patterns into the control of a hybrid vehicle system. As such, the present invention "front loads" the electrical power draw on the hybrid propulsion system so that greater amounts of stored electrical power are drawn down in the early operation of the vehicle. Operation in this mode enhances overall fuel economy while preserving the capability of achieving a realistic driving range. These and other advantages of the invention will be apparent in the drawings, discussion and description which follow.

SUMMARY OF THE INVENTION

Disclosed is a method for operating a hybrid motor vehicle in a front-loaded electrical power mode. The hybrid vehicle has a first propulsion system which is powered by electrical energy stored in a rechargeable battery and a second propulsion system which is powered by oxidation of a fuel. The two propulsion systems are operable jointly or singly to power the motor vehicle. According to the method of the present invention, the level of electrical energy stored in said battery is measured; a percentage of the measured level of stored electrical energy is selected; and a distance "D" is determined, which distance is that which the first propulsion system, operating singly, could power the vehicle on the selected percentage of the measured level of stored electrical energy. A hybrid cruising range, which is greater than D is selected, and the operation of the first and second propulsion systems is controlled in accord with a profile such that when the vehicle has traveled through the hybrid cruising range, the selected percentage of electrical energy stored in the battery is depleted, and when the vehicle has traveled through the first 50% of the hybrid cruising range, over 50% of the selected percentage of electrical energy stored in the battery is depleted, In a specific instance, the propulsion systems are controlled in accord with the profile such that when the vehicle has traveled through the first 25% of the hybrid cruising range, over 25% of the selected percentage of electrical energy stored in the battery is depleted. In particular instances, the selected percentage of electrical energy used in determining the profile is in the range of 70-90% of the measured level of stored energy.

In further embodiments, the operation of the first and second propulsion systems are further controlled so that the vehicle can be put into a reserve power mode wherein the profile is overridden so as to provide the vehicle with a level of power which is greater than a level of power which would have been provided to the vehicle in accord with the profile.

In further embodiments, the method involves the steps of remeasuring the remaining level of electrical energy stored in the battery after the vehicle has been driven for a distance less than the hybrid cruising range, redetermining the distance "D," and adjusting the hybrid cruising range and modifying the profile in accord therewith. These steps of remeasuring and redetermining may be carried out on a repetitive or continuous basis while the vehicle is being driven.

In further embodiments of the invention, the battery may be recharged during the operation of the vehicle by regenerative braking and/or action of the second propulsion system. In some instances, the second propulsion system includes an internal combustion engine, where in other instances, it includes a fuel cell.

Also disclosed herein is a controller which operates to implement the aforedescribed method.

BRIEF DESCRIPTION OF TEE DRAWINGS

Figure 2A:
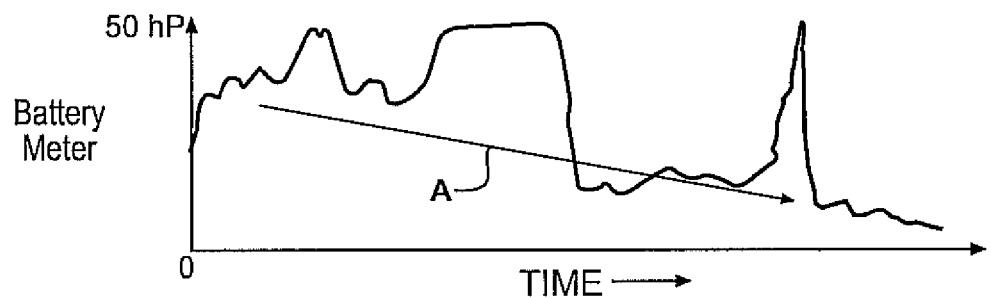
Figure 2B:
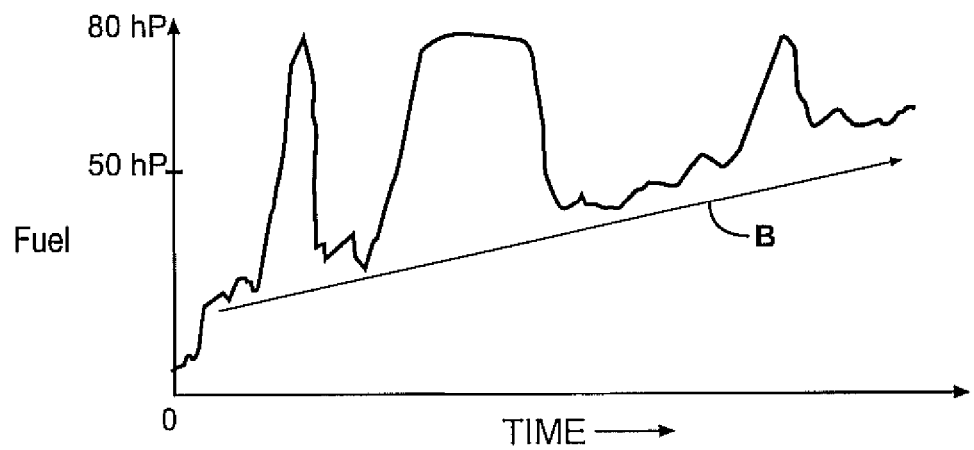
Figure 2C:
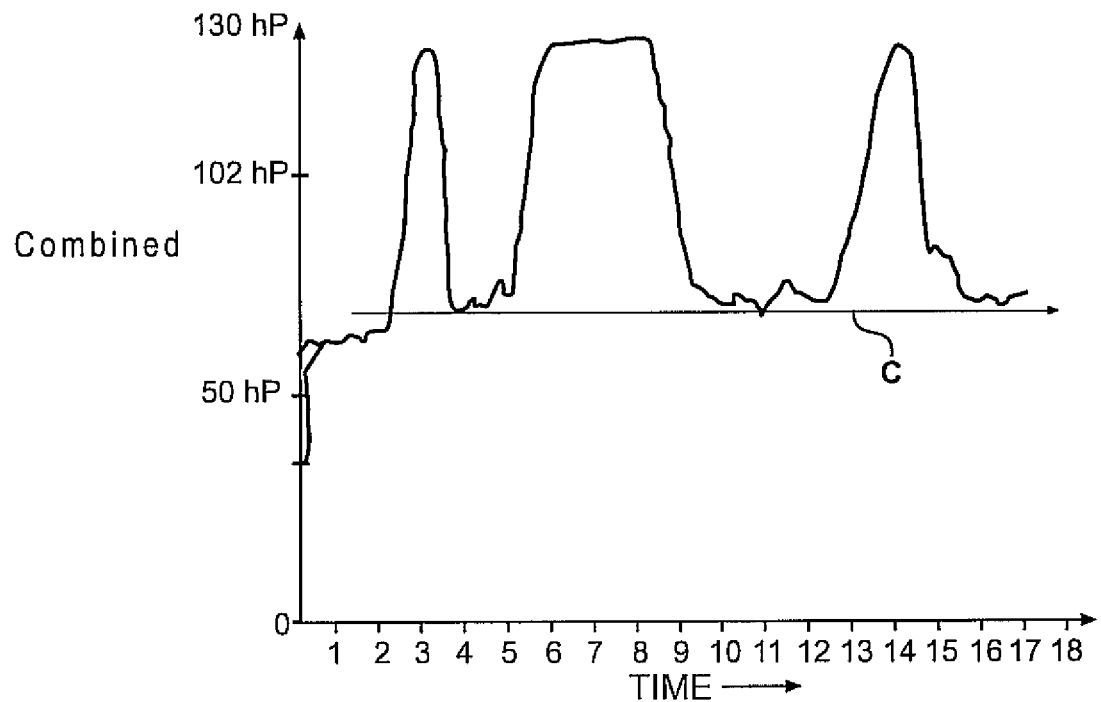

FIG. 1 is a flowchart illustrating a method for operating a hybrid vehicle in a front-loaded electrical mode; and FIGS. 2A-2C are graphs of power consumption versus time for the electrical based, fuel-based and combined propulsion systems of a hybrid vehicle under typical operating conditions.

DETAILED DESCRIPTION OF THE PRESENT INVENTION

The present invention concerns a method and system for "front-loading" the use of battery power in a hybrid vehicle propulsion system, and as such, maximizes fuel efficiency while preserving the vehicle's capability of operating in a high power mode in specialized circumstances, such as when passing, when under heavy loads, or in emergency situations.

In the operation of the "front-loading" power distribution method, the level of electrical energy stored in the battery of a hybrid system is measured. Knowing the amount of stored charge, it is possible to determine a distance, referred to herein as D, which is the distance that the particular electrical propulsion system of the motor vehicle is capable, operating on its own, to drive the vehicle by utilizing a selected percentage of the electrical energy stored in the battery. This selected percentage may comprise all of the energy stored in the battery, in which instance it would be 100%. However, more typically, it is desirable to retain some reserve power in the battery to accommodate emergency or unexpected situations; so typically, the distance D is calculated based upon consumption of an amount of energy in the range of 70-90% of the stored energy.

Once the distance D is determined, the front-loaded method then selects a desired hybrid cruising range, which is a mileage range based upon the fuel efficiency and capacity of the vehicle together with the distance D. This hybrid cruising range will always be greater than the distance D, and may be selected to account for consumption of all of the fuel, or only a portion of the fuel. In some instances, the hybrid cruising range may be selected, presuming that the vehicle will be refueled before the distance D is traveled.

In the "front-loaded" method, a controller associated with the vehicle controls the operation of the electrical propulsion system and the fuel-based propulsion system so that they operate in combination according to a profile, such that when the vehicle has traveled through the hybrid range, the selected percentage of electrical energy stored in the battery will be depleted. The system is further operative to control the operation of the electrical and fuel-based propulsion systems so that in the first 50% of the hybrid cruising range over 50% of the selected amount of electrical energy will be depleted. In further instances, over 25% of the energy will be depleted in the first 25% of the hybrid cruising range. In other words, the system profile is weighted to favor electrical consumption in the initial portions of the cruising range, and fuel consumption in the latter portions of the cruising range. In general, the front-loaded system is more economical than a system which maintains a constant blend of the power sources throughout the cruising range, since, in most instances, typical daily driving is primarily concentrated with the first 25-50% of the cruising range.

The operation of the system is illustrated with reference to the flowchart of FIG. 1. As shown, the system and method operates to first measure the amount of electrical energy stored in the battery system of the hybrid vehicle. In this regard, the system communicates with the battery of the vehicle either directly or indirectly. In a second step, the system selects a percentage of the measured, stored energy to use in subsequent operation. As discussed above, this amount is selected so as to provide some reserve power and also avoid "deep discharging" the storage battery, which can be harmful to particular battery systems. The system then operates to determine a distance D which selected percentage of stored energy is capable of driving the vehicle. This distance may be determined based upon average driving conditions and performance of the vehicle, or in those instances where a specific set of parameters, such as trip length, anticipated road conditions, vehicle loading, weather conditions, and the like, are known, the distance D may be more accurately calculated on that basis. Either mode of operation is within the scope of this invention.

In a subsequent step, the system as shown in the FIG. 1 flowchart then selects a hybrid cruising range, which range is greater than the distance D determined in the previous step.

This hybrid cruising range may, as discussed previously, be variously determined. The hybrid cruising range may be selected based upon the previously determined distance D taking further into account the amount of fuel on board the vehicle. Alternatively, the hybrid distance may be determined based upon the anticipated length of a particular trip or upon an average length of previous trips. The hybrid cruising range may alternatively be input by the user of the motor vehicle. In determining the hybrid cruising range, the controller may also receive inputs indicative of vehicle parameters, such as loading, trip information stored in an on-board navigation system, weather conditions, road conditions, and the like.

Knowing the hybrid cruising range and the amount of stored electrical energy, the controller of the motor vehicle then operates to power the vehicle from a blend of energy inputs from the electrical-based propulsion system and the fuel-based propulsion system so that a disproportionately larger portion of electrical energy will be utilized in the Initial portion of the hybrid cruising range. In the simplest system, for purposes of illustration, the controller may initially blend the two power sources so that at the beginning of the hybrid cruising range 80% of the power is derived from the electrical propulsion system and 20% from the fuel-based system; whereas, in mid-portions of the range, the two systems may contribute equally, on a 50-50 basis. In the final portions of the cruising range, the controller may operate to utilize a blend of 20% of electrical power and 80% fuel-based power. his mode of operation skews the efficiency of the hybrid system toward the earlier portions of the cruising range, acknowledging the fact that typical driving patterns involve relatively short journeys.

In many of the more sophisticated hybrid systems of the prior art, the power controller varies the blending of electrical and fuel-based propulsion systems to accommodate various operational conditions. For example, in conditions where maximum power is needed for passing, hill climbing, or the like, the contributions from the electrical and fuel-based propulsion systems will both be increased over and above the typical profile values. A front-loaded power management system of the present invention can be operated in such a mode.

As further illustrated in FIG. 1, and is discussed above, the system of the present invention may operate to recalculate the distance D during the operation of the motor vehicles and adjust the hybrid cruising range and the blending of propulsion systems accordingly. U-is will provide for more accurate control of the system and better fuel economy.

The operation of the front-loaded power management mode of the present invention will be illustrated, with regard to typical vehicle operating conditions, by reference to FIGS. 2A-2C. FIG. 2A is a graph depicting power delivered by an electrical propulsion system of a hybrid vehicle, under typical driving conditions, as a function of time (which is shown in relative units). FIG. 2B is a similar graph showing power delivery as a function of time for the fuel-based propulsion system of the hybrid motor vehicle. FIG. 2C is a similar graph showing power vs. time for the combined propulsion systems.

Referring now to FIG. 2A, it will be seen at time 0, when the vehicle is just beginning to move, the battery-based propulsion system is delivering approximately 25 hp. At the same time, the fuel-based propulsion system is producing approximately 8-10 hp, as will be seen from FIG. 2B, and the combined power being delivered to the wheels of the vehicle is approximately 35 hp, as will be seen in FIG. 2C. As the vehicle continues to travel for the first two time units, combined power is approximately 60 hp and this is based upon a contribution of approximately 40 hp from the battery powered propulsion system and 20 hp from the fuel-based system.

At three times during the operation of the vehicle, as will be seen at T equals 3, T equals 6-8, and T equals approximately 14, the vehicle is operating under maximum power of 130 hp, and both propulsion systems are operating at their maximum output. These maximum power intervals are characteristic of rapid starts, uphill driving and other high-load conditions.

As will be seen from FIG. 2C, the base horsepower that the vehicle is operating at while under normal cruising conditions is approximately 65-75, as shown by arrow C in FIG. 2C. While this horsepower is quite steady, it will be seen from FIG. 2A that the average horsepower as delivered by the electrical propulsion system during the same interval declines from approximately 45 hp to approximately 10 hp. During the very same interval, the horsepower delivered by the fuel-based propulsion system correspondingly rises, as is shown by arrow B. Thus, it will be seen from these figures that the system of the present invention front-loads loads the power draw on the electrical propulsion system relying to a lesser degree upon the fuel-based system. As the vehicle proceeds through its cruising range, these proportions reverse, with greater dependency being made upon the fuel-based system and lesser dependency upon the electrical system. However, the overall effect is that the two systems cooperate to provide a steady degree of power to the vehicle, while still allowing for an instantaneous and constant high level of power to be tapped for particular situations. Thus, it will be seen that the method and controller of the present of the present invention operate to maximize fuel efficiency while maintaining high performance characteristics of the motor vehicle. This is in contrast to prior art hybrid power control systems which maintain a constant blending profile.

The foregoing, with regard to FIGS. 2A-2C, describes the cooperation of a battery-powered propulsion system and a fuel-based propulsion system in powering a vehicle. As described, each system contributes varying amounts of power as the vehicle is driven. This description is not meant to imply that propulsive power must be delivered to the vehicle by two separate motors. The two propulsion systems, electrical and fuel-based, may share a single electrical motor, with differing power levels being contributed to the motor by each system. For example, a single electric motor may receive a first portion of its electrical power from the battery and a second portion of its power from the fuel-based system. In this regard, the fuel-based system may include a fuel cell which provides the electrical power, or it may include an electrical generator which is driven by a combustion engine to provide the electrical power.

The present invention may be implemented in any propulsion system which utilizes a blend of stored electrical power, and power derived from the oxidation of fuel to propel a vehicle. Such propulsion systems may include any combination of batteries, fuel cells, or combustion engines as configured to comprise a hybrid drive system.

While the system has been described as operating in a plug-in mode wherein a charge of electricity is initially put into a battery and consumed during the operation of the vehicle, in most practical instances, the battery, in addition to being charged in the plug-in mode, will be recharged to some degree during the operation of the vehicle through regenerative braking and/or operation of the fuel-based engine. In such instances, further electrical power will be placed into the battery during the operation of the vehicle, thereby altering the distance D. For this reason, recalculation and adjustment of the profile, as described above, will be of particular benefit.

The electrical propulsion system will typically include a storage battery, which may be any battery known in the art, such as a nickel metal hydride battery, a lithium battery, a lead acid battery, or the like. Batteries are also understood to include electrical storage devices such as capacitors and ultra capacitors. Also included within the context of rechargeable batteries are battery systems in which a body of consumable material is replaced so as to "recharge" the battery. For example, battery systems are available in which a consumable aluminum, zinc, or other such metal electrode is replaced so as to recharge the battery. The electrical propulsion system further includes an electrical motor which is coupled to the driving wheels of the vehicle, either directly or through a mechanical transmission.

The fuel-based propulsion system utilizes the oxidation of a stored fuel to propel the vehicle. In some instances, the fuel is oxidized in an internal combustion engine, and as such, the fuel may be a liquid hydrocarbon or a gas. The mechanical energy produced by the internal combustion engine drives the vehicle's wheels either directly or through a mechanical transmission. Or, the mechanical energy may be converted to electrical energy which drives the vehicle's wheels through an electrical motor. In other instances, the fuel may be oxidized in a device such as a fuel cell so as to produce electrical energy which drives an electrical motor (which may be the same motor driven by the electrical system or a different motor). In such instances, the fuel may comprise a gas, such as hydrogen or hydrocarbon or a liquid, such as a liquid hydrocarbon, an alcohol, or the like. In yet other instances, fuel-based systems may comprise external combustion engines, such as vapor engines, gas turbines, and the like.

The front-loaded system may thus be operated in a combination with a variety of hybrid vehicle propulsion systems. The foregoing discussion, description and examples are illustrative of specific embodiments; but are not meant to be limitations about the practice of the invention. It is the following claims, including all equivalents, which define the invention.

The invention claimed is:

1. A method for operating a hybrid motor vehicle in a front loaded electrical power mode, said hybrid motor vehicle including a first propulsion system which is powered by electrical energy stored in a rechargeable battery, and a second propulsion system which is powered by the oxidation of a fuel, wherein said first and second propulsion systems are operable jointly or singly to power said motor vehicle, said method comprising the steps of:
   measuring the amount of electrical energy stored in said battery;
   selecting a percentage of the amount of electrical energy stored in said battery;
   determining a distance D, that the first propulsion system, operating singly, could propel the vehicle on said selected percentage of the amount of electrical energy stored in said battery;
   selecting a hybrid cruising range which is greater than the distance D; and
   controlling the operation of said first and second propulsion systems in accord with a profile so as to power said vehicle such that when the vehicle has traveled through said hybrid cruising range, said selected percentage of electrical energy stored in said battery is depleted, and when said vehicle has traveled through the first 50% of said hybrid cruising range, over 50% of said selected percentage of electrical energy stored in said battery is depleted.

2. The method of claim 1, wherein said profile is such that when said vehicle has traveled through the first 25% of said hybrid cruising range, over 25% of said selected percentage of electrical energy stored in said battery is depleted.

3. The method of claim 1, wherein said selected percentage of electrical energy is in the range of 70-90% of the measured level of stored power.

4. The method of claim 1, including a further step of controlling the operation of said first and second propulsion systems so that said vehicle can be put into a reserve power mode wherein said profile is overridden so as to provide said vehicle with a level of power which is greater than the level of power which would have been provided to said vehicle in accord with said profile.

5. The method of claim 1, including the further steps of:
   remeasuring the level of electrical energy stored in said battery after said vehicle has been driven for a distance less than said hybrid cruising range; and
   redetermining the distance D, adjusting the hybrid cruising range, and modifying the profile in accord therewith.

6. The method of claim 5, wherein said further steps are carried out on a repetitive or continuous basis while the motor vehicle is being driven.

7. The method of claim 1, including the further step of recharging the battery from the second propulsion system and/or by regenerative braking while the motor vehicle is being driven.

8. The method of claim 1, wherein said second propulsion system includes an internal combustion engine.

9. The method of claim 1, wherein said second propulsion system includes a fuel cell.

10. The method of claim 9, wherein said second propulsion system powers an electric motor.

11. The method of claim 10, wherein said electric motor which is powered by said second propulsion system is also powered by said rechargeable battery.

12. The method of claim 1 wherein the step of selecting a hybrid cruising range comprises manually inputting a hybrid cruising range.

13. The method of claim 1 wherein the step of selecting a hybrid cruising range comprises selecting said hybrid cruising range based upon at least one parameter associated with the motor vehicle.

14. The method of claim 13, wherein said at least one parameter is selected from the group consisting of: the amount of fuel on board the vehicle, loading of the vehicle, an input value indicative of the anticipated length of the trip, stored data corresponding to one or more previous trips, an ambient weather condition, the anticipated route of travel of the vehicle, and time of day.

15. A controller for controlling the operation of a hybrid motor vehicle in a front loaded electrical power mode, wherein the hybrid motor vehicle includes a first propulsion system which is powered by electrical energy stored in a rechargeable battery, and a second propulsion system which is powered by the oxidation of a fuel, wherein the first and second propulsion systems are operable jointly or singly to power the motor vehicle, the controller comprising:
   a measuring circuit for determining the amount of electrical energy stored in the battery;
   a memory for maintaining a value indicative of a selected percentage of the measured amount of electrical energy stored in the battery;
   a calculator for determining a distance D that the first propulsion system, operating singly, could power the vehicle on a selected percentage of the amount of electrical energy stored in the battery;
   a memory for storing data indicative of a hybrid cruising range, which hybrid cruising range is greater than the distance D; and a controller for controlling the operation of the first and second propulsion systems so as to power the vehicle in accord with a profile such that when the vehicle has traveled through the hybrid cruising range, the selected percentage of electrical energy stored in the battery is depleted and when the vehicle has traveled through the first 50% of the hybrid cruising range, over 50% of the selected percentage of electrical energy stored in the battery is depleted.

* * * * *